United States Patent [19]
Fournier

[11] Patent Number: 4,614,348
[45] Date of Patent: Sep. 30, 1986

[54] ANTI-BLOWOUT SEAL

[75] Inventor: Paul J. E. Fournier, Jackson, Mich.

[73] Assignee: Aeroquip Corporation, Jackson, Mich.

[21] Appl. No.: 784,557

[22] Filed: Oct. 4, 1985

[51] Int. Cl.$^4$ .............................................. F16J 15/20
[52] U.S. Cl. ............................... 277/188 A; 277/165; 277/205; 277/177
[58] Field of Search ............... 277/165, 173, 174, 176, 277/177, 188 R, 188 A, 205, 206 R

[56] References Cited

U.S. PATENT DOCUMENTS

| | | | |
|---|---|---|---|
| 2,437,586 | 3/1948 | Aber | 277/177 X |
| 2,915,349 | 12/1959 | Gomberg | 277/165 |
| 3,727,925 | 4/1973 | Jones | 277/165 |
| 4,179,131 | 12/1979 | Nussbaumer | 277/165 |

FOREIGN PATENT DOCUMENTS

| | | | |
|---|---|---|---|
| 249400 | 2/1964 | Australia | 277/165 |
| 1469114 | 1/1967 | France | 277/177 |

Primary Examiner—Robert S. Ward
Attorney, Agent, or Firm—Beaman & Beaman

[57] ABSTRACT

An annular fluid seal for pressurized fluid systems particularly for use with a coupling having interconnectable self-sealing male and female parts. The two-part seal is mounted within an annular gland recess within the male part and includes a relatively rigid primary annular body of synthetic plastic material having an interference fit with the male coupling part poppet valve. The outer diameter of the seal body includes an annular recess receiving an elastomeric O-ring, and the mass of the primary seal body provides maximum strength within the confines of the gland recess to resist deformation due to pressurized fluid to prevent blowout of the seal from its recess.

6 Claims, 5 Drawing Figures

ANTI-BLOWOUT SEAL

BACKGROUND OF THE INVENTION

Fluid couplings for pressurized fluid systems commonly employ interconnectable self-sealing male and female parts. In the most common arrangement the female part includes a cylindrical passage which receives the cylindrical nose of the male part. An annular seal located within a gland recess in one of the parts sealingly engages the other part to establish a fluid-tight relationship between the coupling parts, and locking means defined upon the parts maintain the parts in coupled relationship during use.

Self-sealing valves within the coupling parts automatically seal during disconnection of the parts, and automatically open as the parts are interconnected. A typical example of this type of fluid coupling is represented by the Series FD49 coupling manufactured by the assignee, Aeroquip Corporation of Jackson, Michigan.

In some pressurized fluid systems relatively high pressures are employed, i.e. over 1000 psi, and frequent connection and disconnection of the coupling parts occurs, such as in the use of hydraulically operated tools. During the connection and disconnection of the coupling parts, the annular seal between the parts is exposed to the pressurized fluid prior to the seal being completely internally supported. This exposure of the unsupported seal to high pressure hydraulic fluid often causes the seal to "blow-out" from its recess due to distortion of the seal by the pressurized fluid. Of course, such a "blow-out" destroys the sealing ability of the coupling, and a new seal must be installed to restore the coupling to a usable state.

It is an object of the invention to provide a seal for use with a coupling for pressurized fluid systems wherein the seal resists "blow-out", when the coupling parts are connected under pressure and overcomes many of the problems previously attendant with seals used in a similar environment and coupling type.

A further object of the invention is to provide a seal for pressurized fluid systems which may be installed within a standard annular gland recess and includes a body of synthetic plastic material having sufficient mass and internal strength to resist deformation and also provide support for an elastomeric O-ring mounted upon the outer portion of the body.

In the practice of the invention a two-part seal is utilized which is most commonly located within the male part of a two-part fluid coupling. The seal is located within an annular gland recess of standard dimension intersecting the male part passage, and the seal engages the cylindrical surface of a valve component of the female part when the male part is inserted into the female part passage.

The seal includes a primary annular body formed of synthetic plastic material, preferably polytetrafluoroethylene, having an inner cylindrical bore for sealingly engaging the cylindrical poppet valve of the male part with an interference fit. The outer circumference of the seal body is circular, and a recess is defined in the outer circumference concentric with the seal axis and centrally located between the radially extending body sides defining the seal body length.

An elastomeric O-ring is located within the seal body recess, and the O-ring has a cross-sectional diameter greater than the radial depth of the recess so as to extend radially beyond the seal body circumference. The O-ring seals the primary body with respect to the male part gland recess.

In accord with the concepts of the invention the dimensions of the primary seal body are the maximum to fit the seal into a standard gland recess to resist deformation due to fluid pressure and prevent "blow-out". To this end the cross-sectional radial thickness of the primary seal body is only slightly less than the gland recess radial depth and the cross-sectional radial thickness of the primary body from its inner diameter to the bottom surface of the O-ring receiving recess is, preferably, at least equal to the radial depth of the recess. Further, the axial dimension of the primary seal body is only slightly less than the gland recess axial length and the axial dimension of the seal body on each axial side of the O-ring receiving recess is sufficient to properly support the O-ring against extrusion around the body circumference, and preferably, the axial thickness between the radial side of the seal body and the nearest recess side is approximately equal to the radial thickness of the body between its inner diameter and bottom surface of the O-ring receiving recess.

While the primary seal body is semi-rigid, it is capable of sufficient manual deformation to permit installation in the coupling part gland recess, and it is one of the features of a seal in accord with the inventive concept that it may be readily assembled to its associated coupling part and retrofitted into a standard gland recess without modification to the coupling part or gland.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figures 1, 2, 3, 4, 5:
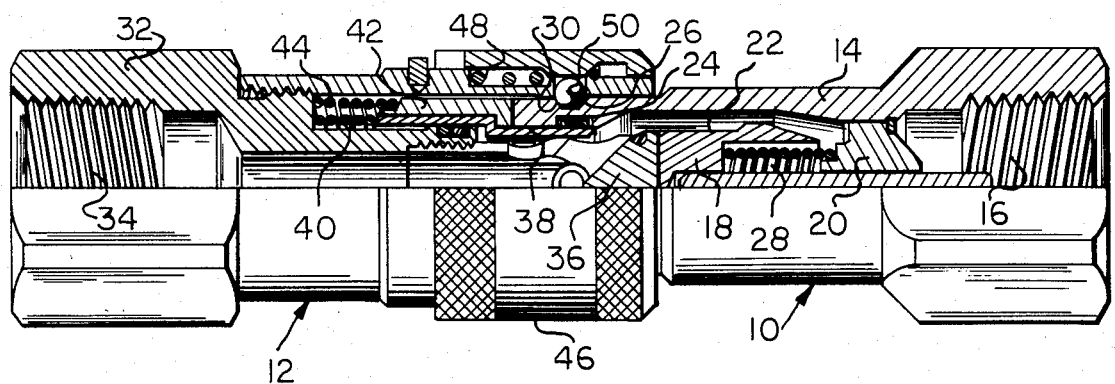
FIG. 1 is an elevational view, partially in section, illustrating a typical fluid coupling utilizing a seal in accord with the invention, the coupling parts being shown in the fully coupled condition.
FIG. 2 is an enlarged, detail, elevational, sectional view illustrating a prior art seal arrangement over which the invention is an improvement.
FIG. 3 is an enlarged, detail, elevational, sectional view of a seal in accord with the invention as installed within a standard gland recess.
FIG. 4 is an enlarged, cross-sectional view of a seal, per se, in accord with the invention.
FIG. 5 is an end elevational view of a coupling showing deformation of the seal of the invention during installation thereof within its coupling part.

A typical self-sealing fluid coupling in which a seal in accord with the invention may be utilized is shown in FIG. 1. The coupling illustrated is the Series FD49 manufactured by the assignee, Aeroquip Corporation, and is used in a variety of pressurized hydraulic fluid circuits, including those used with hydraulic tools, and couplings of this type commonly handle hydraulic pressures up to 2000 psi.

The coupling shown in FIG. 1 includes a male part 10 and a female part 12. The parts may be mounted upon the ends of a flexible hose, or one of the parts may be rigidly affixed to a tool or other component of the hydraulic circuit with which the coupling is utilized, not shown. The coupling parts are shown in the fully coupled condition, and when uncoupled this type of coupling is characterized by relatively flush surfaces at the coupling part's outer ends wherein the surfaces may be kept clean and air and foreign matter is substantially excluded as the parts are interconnected.

The male part 10 includes a body 14 having a passage threaded at 16 for connection to a hose or other conduit of the fluid system. Internally, the passage includes the flat face poppet valve 18 reciprocally mounted on spider 20, and the valve includes a cylindrical surface 22 for engaging the annular seal 24 located in gland recess 26 when the coupling parts are disconnected. A compression spring 28 biases the valve 18 toward the left to its closed position. Externally, the male part 10 includes an annular detent receiving groove 30 for receiving the detent balls mounted upon the female part as later described.

The female part 12 includes a body 32 having a passage internally threaded at 34 for attachment to the associated conduit, not shown. The female member includes a central ported head 36 threaded within the passage, and an annular valve sleeve 38 is biased toward the right by compression spring 40 for engaging the head 36 to seal the head and body passage. Also, the annular filler sleeve 42 is biased to the right by spring 44, and a locking ring 46 reciprocally mounted on the female member and biased toward the right by spring 48 forces the ball detents 50 inwardly when the locking ring is in the position shown in FIG. 1.

When the coupling parts 10 and 12 are fully interconnected as shown in FIG. 1 the valve sleeve 38 will be sealingly located within seal 24, and the ball detents 50 will be held in the groove 30 by ring 46. Full fluid flow occurs through the head 36 and about valve 18 and the coupling is in its operative position as illustrated.

During the coupling and uncoupling of the parts 10 and 12 the seal 24 will be exposed to fluid pressure within the copuling part 10 after the valve 18 is removed from engagement with the seal, and prior to the valve sleeve 38 entering the seal 24. During these instances, especially during the connect cycle when the male part 10 is pressurized, the exposure of the seal 24 to the hydraulic pressure may cause the unsupported seal to "blow-out" of its associated gland recess 26 and in accord with the inventive concepts such an occurrence is prevented.

FIG. 2 illustrates a common prior art type of seal used with the coupling shown in FIG. 1. The gland recess 26 defined in the male part 10 receives an elastomeric O-ring 52 and an annular retaining ring 54. This type of arrangement did not prevent blow-out of the O-ring 52 as the O-ring is directly exposed to the fluid and would be deformed by the hydraulic fluid pressure during connection and disconnection, and would often be blown from the recess 26. To overcome this problem a seal constructed as shown in FIGS. 3 and 4 has been successful.

With reference to FIG. 3, the seal 24 is located within the male coupling part gland recess 26. The recess 26 includes radially extending slightly converging sides 56, tangential radii 58, and a cylindrical base surface 60. The gland recess 26 with which the seal of FIG. 3 is employed is the same recess of FIG. 2, and it is to be appreciated that the seal in accord with the invention may be retrofitted to existing fluid couplings without modification to the coupling.

The seal 24 in accord with the invention consists of two components, an annular body 62, and the elastomeric O-ring 64. The body 62 is formed of a semi-rigid synthetic plastic material, such as virgin polytetrafluoroethylene sold under the trademark Teflon by the Dupont Company, and this material has commonly been used for seals in fluid systems because of its compatibility with many types of fluids, strength, and self-lubricative qualities.

The body 62 includes a cylindrical inner bore 66, radially extending sides 68 which are perpendicular to the body axis, and a cylindrical circumference is defined by surfaces 70. Preferably, the intersection of the bore 66 and sides 68 is chamfered at 72 to aid entrance of the valve components into the seal body bore.

An annular O-ring receiving recess 74 is concentrically defined in the circumference of the body 62 axially located centrally thereon between the sides 68. The recess includes convex radiused sides 76 which tangentially merge into the recess bottom surface 78 which is cylindrical and concentric with respect to the body configuration.

The elastomeric O-ring 64 is located within the recess 74, and is of a cross-sectional diameter greater than the radial depth of the recess 74 with respect to the circumference surfaces 70 wherein, in a normal state, the outer portion of the O-ring will radially extend beyond the body circumference.

As will be appreciated from FIG. 3, the radial thickness of the seal body 62 between the bore 66 and the circumference 70 is only slightly less than the radial depth of recess 26. Likewise, the axial dimension of body 62 as defined by sides 68 is only slightly less than the axial dimension of recess 26 as defined by sides 56. Thus, the mass and dimensions of the body 62 are related to the recess 26 so that the body is of a maximum size receivable within recess 26 whereby the seal body resists deformation, is of maximum mass, and firmly holds the O-ring 64 in recess 26 and prevents the O-ring from being blown out of the recess.

The seal 24 in accord with the invention is installed within the coupling part gland recess 26 by deforming the seal in a manner as will be apparent from FIG. 5. The installer exerts a radial force at one location on the circumference of the seal 24, by a tool, if desired, to cause a portion 80 to deform inwardly which, temporarily, reduces the diametrical dimension of the seal permitting the seal to be inserted into the open end of the male part 10 after the valve 18 has been depressed inwardly into the passage of body 14. Upon the deformed seal being axially aligned with the recess 26 the seal portion 80 is released and will expand into the recess to form the relationship shown in FIGS. 1 and 3.

When the coupling parts 10 and 12 are disconnected, the valve 18 will be located within the seal 24 and a fluid-tight interference fit relationship will exist between the bore 66 and the valve 18, and likewise, a fluid-tight relationship exists between the O-ring 64 and the recess bottom surface 78 and the gland recess base surface 60. Upon the male and female parts being coupled as shown in FIG. 1, the valve sleeve 38 will be located within the body bore 66 establishing a sealed relationship thereto and the seal 24 will permit the coupling to be used without leakage of hydraulic fluid.

During those instances during connection and disconnection when the seal 24 is exposed to the hydraulic pressure tending to produce a "blow-out" condition, the confinement of the seal body 62 within the gland recess 26, the mass and semi-rigidity of the seal body 62 and the fact that the O-ring 64 seals the body within the gland recess will retain the seal 24 within the male part and prevent blow-out. The fact that the body circumference 70 is relatively close to the recess base surface 60 prevents extrusion of the O-ring 64 about the seal body circumference, and as the O-ring 64 is confined within the recess 74 its deformation is prevented and the concave contour of sides 76 prevents localized stresses from being imposed upon the O-ring.

As the mass and proportional dimensional configuration of the seal body 62 and O-ring 64 are of significance, typical dimensions are set forth below to aid in the appreciation of the inventive concepts.

With reference to FIG. 4, in a seal body 62 having an internal bore 66 of a diameter of approximately 0.490 inches the outer diameter of the seal is 0.596 inches producing a dimension at A of 0.053 inches. The width of the seal body 62 as represented at B is 0.127 inches while the width of the recess 74 as represented at C is 0.067 inches. The sectional diameter of the O-ring 64 as represented by dimension D is 0.039 inches.

The depth of the recess 74 from the seal body circumference 70 as shown at E is 0.0235 inches while the radial thickness of the seal body from the inner bore 66 to the recess bottom surface 78 is 0.0297 inches at F. The axial dimension between a side 68 of the seal body and the nearest side 76 of the recess 74, as shown at G, is 0.30 inches.

From the above typical dimensions it will be appreciated that the dimension F is greater than the depth of the recess as represented by dimension E. Also, the axial dimension of the seal body on each side of the recess 74 as represented by dimension G is approximately equal to the dimension F, and the aforementioned ratio of dimensions produces a seal having excellent blow-out resistant characteristics.

The above described ratio of dimensions results in a "large" seal body 62 as compared with a "small" O-ring 64 and as the size and mass of the seal body 62 is such as to substantially occupy the volume of the gland recess 26 excellent resistance to fluid pressure distortion and blow-out is achieved.

The ability to retrofit the seal 24 of the invention to existing couplings eliminates the blow-out problems occurring in couplings presently in use, and it is appreciated that various modifications to the inventive concepts may be apparent to those skilled in the art without departing from the spirit and scope of the invention.

I claim:

1. A seal for pressurized fluid systems adapted to establish a seal between a first cylindrical member received within a second member having a cylindrical opening, the second member having an annular concentric recess intersecting said opening wherein the seal is located within the annular recess, the recess being defined by radial sides and a base surface, the seal being characterized by its resistance to being blown out of the recess by pressurized fluid comprising, in combination, an annular body of semi-rigid synthetic plastic material having an inner cylindrical bore sealingly engageable with the first cylindrical member and having an axis, axially spaced radially extending sides spaced apart a distance slightly less than that separating the recess sides, and an outer circular circumference radially spaced from said bore a distance slightly less than the radial depth of the recess whereby said body substantially fills the second member recess and the recess confines said body from significant radial and axial movement therein, an annular ring recess defined in said body outer circumference intermediate said body sides and concentric to said body axis, said ring recess being defined by radially extending sides intersecting said body circumference and a bottom surface, the radial dimension of said body from said inner bore to said ring recess bottom surface being at least as great as the radial depth of said ring recess from said body outer circumference to said ring recess bottom surface, and an annular elastomeric seal ring within said ring recess having a radial cross-sectional dimension greater than the radial depth of said ring recess whereby said seal ring engages the recess base surface and said body bore sealingly receives the first cylindrical member.

2. In a seal for pressurized fluid systems as in claim 1, said elastomeric seal ring comprising an O-ring.

3. In a seal for pressurized fluid systems as in claim 1, said ring recess being centrally defined between said body radially extending sides.

4. In a seal for pressurized fluid systems as in claim 1, said elastomeric seal ring comprising an O-ring and said ring recess sides comprising concave surfaces tangentially intersecting said ring recess bottom surface.

5. In a seal for pressurized fluid systems as in claim 1, said ring recess being centrally defined between said body radially extending sides and the axial dimension of said body between a ring recess side and the nearest body radially extending side being approximately equal the radial dimension of said body from said inner bore to said ring recess bottom surface.

6. In a seal for pressurized fluid systems as in claim 1, said body being formed of polytetrafluoroethylene.

* * * * *